United States Patent Office 2,982,783
Patented May 2, 1961

2,982,783
2-AMINO-INDANES

Martin Schenck, Berlin-Frohnau, and Helmer Richter, Berlin-Grunewald, Germany, assignors to Schering A.G., Berlin, Germany No Drawing. Filed Dec. 28, 1955, Ser. No. 556,021

Claims priority, application Germany June 11, 1953

9 Claims. (Cl. 260—571)

This present invention relates to new and useful 2-amino-indane compounds and more particularly to 2-amino-indane compounds which have been found to have a good therapeutic action, particularly as analeptics, and also as analgesics and local anaesthetics.

This application is a continuation-in-part of our co-pending application Serial No. 434,082, filed June 2, 1954, for "2-Amino-Indan Derivatives," now abandoned.

It is an object of the present invention to provide new 2-amino-indanes and more particularly 2-amino-indanes carrying hydrocarbon residues as substituents in 1-position and containing a keto or hydroxyl group in 3-position, and also to methods of producing the new compounds of the present invention.

It is another object of the present invention to provide new N-derivatives of the 2-amino-indanes of the present invention and methods of producing such derivatives.

It is still another object of the present invention to provide new 2-amino-indan compounds, which new compound have valuable therapeutic actions, particularly as analeptics, and also an analgesics and local anaesthetics, and which compounds are useful in the treatment of animals wherever the treatment calls for the use of an analeptic agent, and which also may be used in the treatment of human beings.

Other objects and advantages of the present invention will be apparent from a further reading of the specification and of the appended claims.

With the above objects in view, the present invention mainly comprises as a new composition of matter, an amino-indane having the following structural formula:

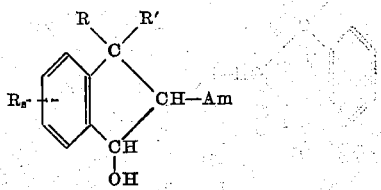

wherein R is selected from the group consisting of hydrogen, alkyl, aryl, alkyaryl, aralkyl and alicyclic radicals; where R' is selected from the group consisting of alkyl, aryl, alkaryl, aralkyl and alicyclic radicals; wherein Am is selected from the group consisting of the amino group, mono-substituted amino groups substituted by alkyl, aryl, aralkyl, alkaryl and alicyclic radicals, di-substituted amino groups substituted by alkyl, aryl, aralkyl, alkaryl and alicyclic radicals, and 5 and 6 member saturated nitrogen-containing heterocyclic radicals linked to the rest of the molecule by the N atom; and wherein $R_S$ is selected from the group consisting of hydrogen and radicals capable of substituting for the hydrogen atom and onto a carbon atom of the benzene ring.

The groups R and R' may be alkyl groups such as methyl, ethyl, propyl, butyl, amyl and the like; they may be aryl groups such as phenyl, biphenyl, naphthyl and the like; they may be alkaryl groups such as toluyl, ethylphenyl and the like; they may be aralkyl groups such as benzyl, phenylethyl, naphthylmethyl and the like; and they may be alicyclic radicals such as cyclopropyl, cyclobutyl, cyclopentyl, cyclohexyl, cycloheptyl and the like. Of course these are only illustrative of the possible substituents for R and R', and other equivalent groups may be substituted therefor.

It should also be noted that either or both of the groups R and R' may be alkyl, aryl, alkaryl, aralkyl or alicyclic radicals, but only one of the groups R may be a hydrogen atom. It should further be noted that the groups R and R' may be the same or different alkyl, aryl, alkaryl, aralkyl and alicyclic radicals.

As stated above, the group Am may be the amino group or a primary or secondary amino group, or a heterocyclic nitrogen-containing radical. Most preferably, Am is the unsubstituted amino group or is a mono- or di-substituted amino group substituted by a lower alkyl group of not more than 4 carbon atoms. In the case of the secondary amines, the substituted alkyl groups may be the same or different groups. It is also preferred that the group Am be a saturated 5 or 6 member heterocyclic nitrogen-containing radical.

As examples of the suitable groups represented by Am may be mentioned, the mono-alkyl amino groups such as methylamino, ethylamino, propylamino, isopropylamino and butylamino; the secondary amino groups such as dimethylamino, diethylamino, or mixed dialkylamino groups such as methylethylamino, ethylpropylamino, methylbutylamino, and the like; and the saturated heterocyclic radicals such as piperidino, pyrrolidino, morpholino, oxazolidino, thiazolidino, piperazino, and the like.

The group $R_S$ may be a hydrogen atom or any normal substituent for the hydrogen of the benzene ring such as an alkyl group e.g. methyl, ethyl, propyl, butyl, amyl, and the like, or an alkoxyl group such as methyloxy, ethyloxy, propyloxy and the like, as well as a hydroxyl radical. The production of a compound with such substituent in the benzene ring of the indan system may be achieved by introducing the substituent into the benzene ring either before or after the formation of the amino-indane derivative.

The production of the derivatives of the present invention may be carried out starting from indanone-3 which is substituted in the 1-position, in either of two ways:

(a) The indanone-3 is halogenated by means of chlorine, bromine or the like, whereby the halogen is introduced in 2-position, and the halogen is replaced by ammonia or a primary or secondary amine having the formula

wherein $R_1$ and $R_2$ are hydrogen, alkyl, aryl, alkaryl, aralkyl or alicyclic radicals. Subsequently, the keto group in 3-position is reduced so as to form the corresponding indanol.

(b) The indanone-3 may be treated with a nitrosing agent such as nitrous acid, or a nitrite such as butyl nitrite or the like whereby the oxime-2 is formed and this is transformed into the 2-amino compound by hydrogenation. If it is desired to retain the keto group in 3-position, this group is protected, for example by acetalization, or the isonitroso group is subjected to suitably mild reduction conditions, for example reduction with palladium as catalyst in the presence of hydrogen chloride under normal conditions. The alkylation of the amino group may then follow in known manner for example by reductive alkylation or by means of the Eschweiler-Clarke modification of the Leuckart reaction. The indan nucleus can carry further substituents as well as the R and R' substituents such as aryl and aralkyl groups in the 1-position of the indan molecule, for example alkyl groups, alkoxy groups, hydroxyl groups and the like in the benzene ring of the indan nucleus.

Although the present invention can result in the production of amino-ketones of the indan, the present invention is mainly interested in the production of the amino-alcohols because the amino-ketones decompose very easily. These amino-ketones easily go over as free bases, particularly in alkaline solution wherein they are easily transformed into the pyrazine derivative. Also, the aqueous solutions of the corresponding amino-ketone-hydrochloride are extremely unstable, as may be recognized by the discoloring and clouding within a few minutes. The corresponding amino-alcohols on the other hand are extremely stable.

In the production of the above mentioned amino-alcohols, the isolation of the amino-ketones as intermediate product is to be avoided as much as possible. For this purpose it has been shown that when carrying out the process described under (b) above, the use of activated palladium as a catalyst is an effective means of accomplishing this result. In this manner the reduction of the keto group and the isonitroso group is carried out in a single step.

It has further been found that in this last mentioned manner of producing the 2-amino indanol-3, it is especially advantageous to utilize the technically most preferred nickel catalysts, especially Raney nickel, whereby the reduction may be carried out in neutral or even alkaline solution and preferably under normal conditions, e.g. without superatmospheric pressure and at room temperature.

The reaction mechanism of the process of the present invention utilizing the process under (a) or (b) above may be illustrated by the following equations:

wherein $R_1$ and $R_2$ are either hydrogen, alkyl, aryl, aralkyl, alkaryl or alicyclic radicals, and wherein $R_1$ and $R_2$ may be the same or different groups.

Compounds wherein the 2-position contains a monosubstituted amino group, or a di-substituted amino group, or a heterocyclic nitrogen-containing radical may be produced in a similar manner.

The new compounds of the present invention have been found to exhibit an unexpectedly excellent pharmaceutical action as an analeptic agent which is marked by its absence of sympathomimetic side effects such as increase in blood pressure, etc., as compared to the known analeptic agents such as Pervitin (desoxyephedrin hydrochloride). The compounds of the present invention also have an analgesic and a local anaesthetic effect. However, their action for therapeutic purposes in both animals and human beings is of greatest importance with respect to the analeptic properties thereof. In addition to an absence of undesirable side effects such as increase of blood pressure, the compounds of the present invention are superior to known analeptic agents such as Pervitin in that the present invention compounds have a much lower toxicity.

The following are examples of the production of various compounds of the present invention. It is to be understood that these examples are given for illustrative purposes only, and the scope of the present invention is not meant to be limited to the specific details of the examples.

EXAMPLE 1

(a) *The production of 1-phenyl-2-isonitrosoindanone-(3)*.—20.8 g. of 1-phenyl-indanone-(3), produced according to Auwers, Ber. d. Dtsch.Chem.Ges., 52, 110, is dissolved in 200 cc. of ether and 150 cc. of benzol.

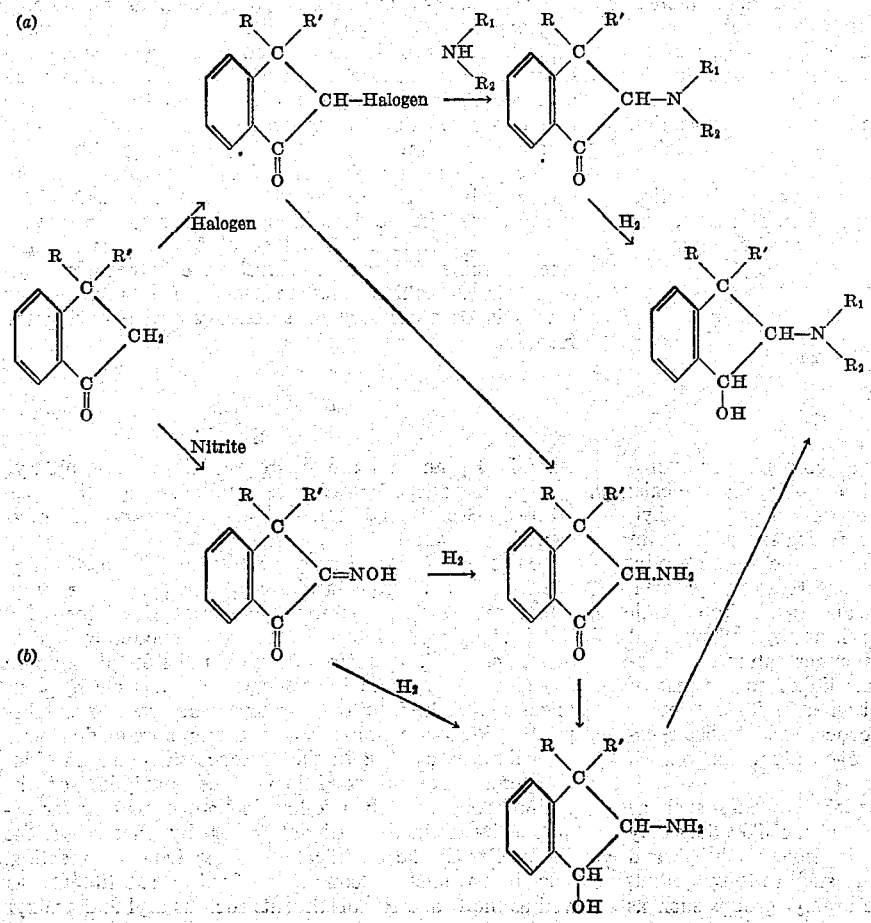

While passing through hydrogen chloride gas, 10.8 g. of butyl nitrite are added dropwise while stirring. After a time, the isonitro-ketone precipitates-out. Thereupon an additional 100 cc. of benzol is added and the reaction mixture is cooled. There is obtained after filtering-off by suction 20 g. of the isonitroso-ketone, having a brown color and a melting point of 202–204° C. The product can be re-crystallized from methanol whereupon it has a melting point with decomposition at 211–212° C.

(b) *Hydrogenation of 1-phenyl-2-isonitrosoindanone-(3)*.—The reduction of the isonitroso group can be carried out utilizing palladium as catalyst. It is possible to isolate the amino-ketone. If the catalyst is activated by the addition of palladium chloride solution, the operator is in a position to also hydrogenate the keto group. If palladium chloride is added right from the beginning, the reduction may be carried out without isolation of the amino-ketone directly to the production of the amino-alcohol.

(c) *The production of 1-phenyl-2-aminoindanone-(3)-hydrochloride*.—11.8 g. of 1-phenyl-2-isonitroso-indanone-(3) is dissolved in 100 cc. of methanol containing 5.5 g. of hydrogen chloride. 3 g. of palladium carbon catalyst is added and the mass is hydrogenated at room temperature and normal pressure. After 2 hours the hydrogenation is complete. The catalyst is filtered-off by suction and the solution is concentrated in a nitrogen atmosphere under vacuum. The hydrochloride is precipitated-out by the addition of ether, the hydrochloride melting at 274–280° C.

(d) *The production of 1-phenyl-2-aminoindanol-(3)*.— 8.3 g. of 1-phenyl-2-aminoindanone-(3)-hydrochloride is dissolved in ethanol and is hydrogenated with the preceding catalyst by the addition of a palladium chloride solution which contains 0.5 g. of palladium chloride. The hydrogenation is completed after 2 hours. The solution is filtered-off from the catalysts, evaporated and the residue taken up in water. The base is precipitated from the solution upon cooling by means of ammonia. The 1-phenyl-2-aminoindanol-(3) may be recrystallized from dioxane and has a melting point of 189–191° C. (Dioxane adheres thereto as crystalline dioxane.) The salt may be obtained from the base by treatment in the usual manner. The bitartrate melts with decomposition at 187–189° C., the neutral sulfate melts with decomposition at 219–221° C., the hydrochloride is very hygroscopic.

The following equations illustrate the reactions in this example:

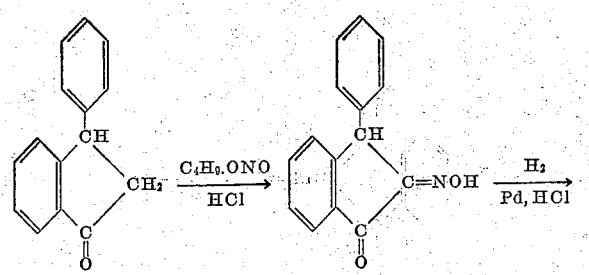

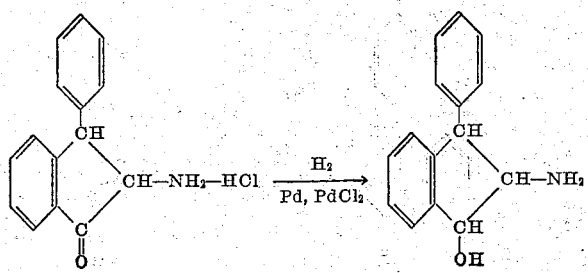

EXAMPLE 2

*The production of 1-phenyl-2-dimethylamino-indanol-(3)*.—4.4 g. of 1-phenyl-2-aminoindanol-(3) is mixed with 5.1 g. of 90% formic acid and 3.6 g. of 37% formaldehyde solution. The mixture is warmed in a steam bath for 4–5 hours. After the evolution of gas has subsided, a clear yellowish liquid results. After ending the heating, 2 g. of concentrated hydrochloric acid is added and the reaction mixture is dried under vacuum. The dried reaction mixture is then taken up in water and the solution is decolorized with activated charcoal. The base is precipitated by means of ammonia and extracted with warm chloroform. The thus isolated base is rubbed with petroleum ether, filtered-off by means of suction and transformed into the hydrochloride which has a melting point of 194–196° C.

The reaction mechanism is as follows:

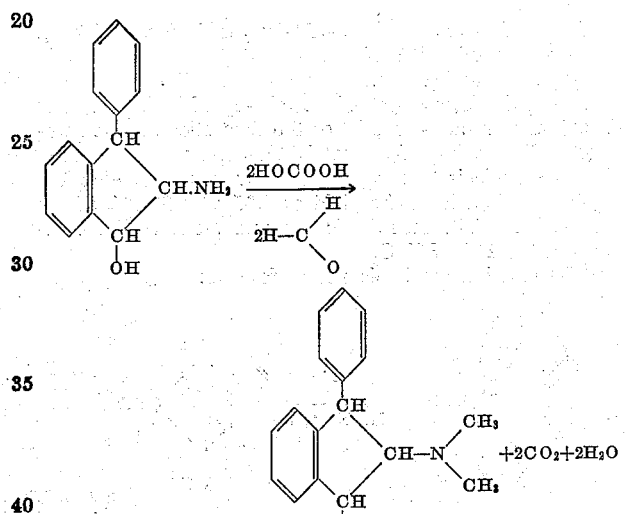

EXAMPLE 3

*1-phenyl-2-amino-indanol-(3)*.—1.3 g. of 1-phenyl-2-isonitrosoindanone-(3) is hydrogenated in 5 cc. of methanolic sodium hydroxide solution (5 g. of sodium hydroxide in 5 cc. of water and 90 cc. of methanol) and 5 cc. of methanol by means of Raney nickel under normal conditions. The hydrogen taken-up after 1 hour amounts to 0.93 of the theoretical. The hydrogenation solution after separation is diluted with water and filtered, the base precipitating-out and having a melting point of 159–163° C. The base may be recrystallized from dioxane. The melting point is then 162–164° C. The difference in the melting point between the product of this example and the product of Example 1 may be explained by stereochemistry. The yield of pure product is about 80% of the theoretical.

The reaction mechanism is as follows:

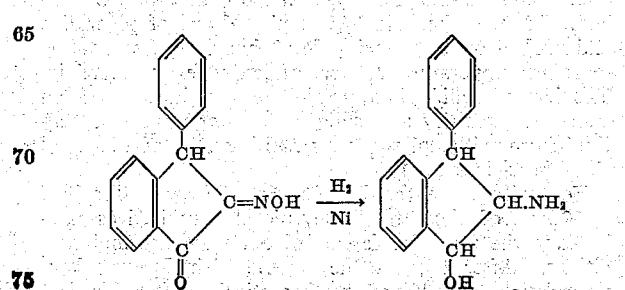

EXAMPLE 4

*1-phenyl-2-amino-indanol-(3)*.—1.2 g. of 1-phenyl-2-isonitrosoindanone-(3) is hydrogenated in 5 cc. of methanolic sodium hydroxide solution (5 g. sodium hydroxide in 5 cc. of water and 90 cc. of methanol) and 5 cc. of methanol with Raney nickel under increased pressure of 20 atmospheres. The hydrogen taken-up after 5 minutes amounts to 0.93 of the theoretical. The hydrogenation solution is diluted with water after separation of the catalyst, the precipitated base having a melting point of 159–163° C. The base may be recrystallized from dioxane. The melting point then lies at about 162–164° C. The yield of pure compound is about 80% of the theoretical. The reaction mechanism is the same as in the previous example, except for the use of 20 atmospheres of pressure.

EXAMPLE 5

*1-methyl-2-amino-indanol-(3)-hydrochloride*.—1.74 g. of 1-methyl-2-isonitrosoindanone-(3) is hydrogenated in 100 cc. of methanol under normal conditions utilizing Raney nickel as catalyst. The take-up of hydrogen after 3½ hours amounts to 0.98 of the theoretical. The solution is filtered free of the catalyst and concentrated. The hydrochloride is then precipitated by means of etherical hydrochloric acid. The yield of 2.05 g. is 96.8% of the theoretical. The resulting compound melts with decomposition at 234–236° C.

The reaction mechanism is as follows:

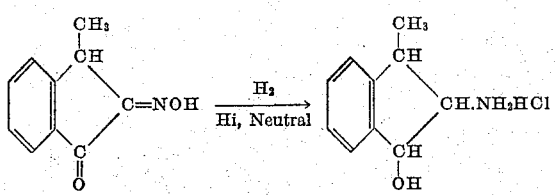

By N-methylation in the manner described in Example 2, the 1-methyl-2-amino-indanol-(3) can be converted to the hydrochloride of the corresponding 1-methyl-2-dimethyl-amino-indanol-(3) which has a melting point of 172–173° C.

EXAMPLE 6

*1-methyl-2-amino-indanol-(3)-hydrochloride*.—8.8 g. of 1-methyl-2-isonitrosoindanone-(3) is hydrogenated in 50 cc. of methanolic sodium hydroxide solution (5 g. sodium hydroxide in 5 cc. of water and 90 cc. of methanol) and 50 cc. of methanol under normal conditions utilizing Raney nickel as catalyst. The hydrogen take-up after 3¼ hours amounts to 0.9 of the theoretical. The working up results in the hydrochloride melting with decomposition at 234–236° C. The reaction mechanism is the same as in the previous example except that an alkaline solution is utilized.

EXAMPLE 7

*1-phenyl-2-methylamino-indanol-(3)*.—11.3 g. of 1-phenyl-2-amino-indanol-(3) is mixed with 75 cc. of ethanol, 5.3 g. of benzaldehyde and 2 drops of piperidine and cooked under refluxing for 2 hours. After cooling to room temperature 200 cc. of ice water is stirred in. The formed Schiff's base precipitates first in greasy form and then gradually as a solid. The product is recrystallized from methanol and has a melting point of 142–143° C. The yield is 9.7 g.

To hydrogenate the Schiff's base, 8.9 g. is dissolved in 120 cc. of dioxane. Raney nickel is utilized as catalyst and the reduction is carried out under normal conditions. After 2 hours, the amount of hydrogen taken-up amounts to 100% of the theoretical. After this time period the hydrogenation is interrupted. The solution is filtered-off from the catalyst and is concentrated in vacuum. It is then mixed with water, the hydrogenated base is sucked-off and washed with water. After drying over phosphorus pentoxide and potassium hydroxide there is obtained 8.7 g. of 1-phenyl-2-benzylamino-indanol-(3). The melting point after recrystallization from methanol is 155–156° C.

5.1 g. of 1-phenyl-2-benzylamino-indanol-(3) is methylated by mixing with 4.2 g. of 85% formic acid and 1.5 g. of 38% formaldehyde. The reaction mixture is heated for 4 hours in a steam bath. This results in a strong evolution of carbon dioxide and a clear brown solution is formed. After the addition of 2 cc. of concentrated hydrochloric acid the solution is concentrated in vacuum as far as possible. The residue is alkalized with soda solution and the 1-phenyl-2-benzyl-methyl-amino-indanol-(3) is drawn-off by means of chloroform. The chloroform solution is concentrated in a steam bath. The hydrochloride is precipitated by the addition of etherical hydrochloric acid. The substance may be precipitated from methanol-ether. The substance melts with decomposition at 224–225° C. The yield is 5.4 g.

To de-benzylate the substance, 4.8 g. of 1-phenyl-2-benzyl-methyl-amino-indanol-(3)-hydrochloride is dissolved in 70 cc. of methanol and hydrogenated at 50° C. under normal pressure utilizing 960 mg. of palladium black as catalyst. After 35 minutes the hydrogen taken-up amounts to 1 mol $H_2$. The catalyst is separated by suction filtering, the solution is concentrated in vacuum and mixed with ether. The precipitated 1-phenyl-2-methylamino-indanol-(3)-hydrochloride is filtered-off by suction and washed with ether. The yield is 4 g. The substance melts at 150–152° C. The substance dried at 100° C. contains ½ mol of water. The free base obtained from the hydrochloride melts at 165–167° C.

The reaction mechanism of this example is as follows:

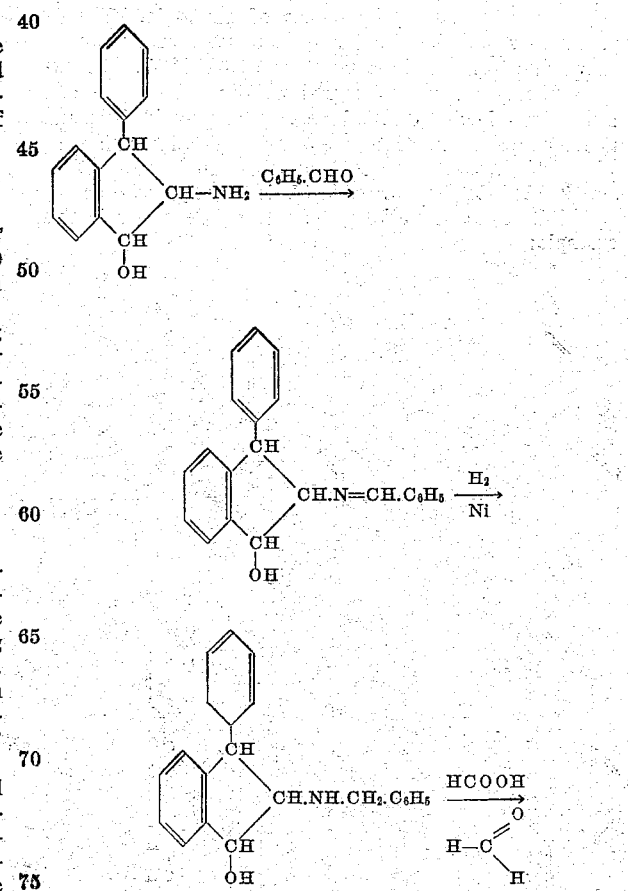

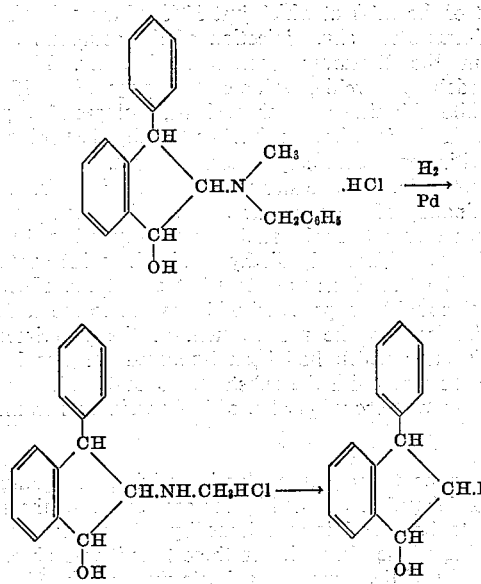

EXAMPLE 8

*1-phenyl-2-piperidino-indanol-(3)*.—2.25 g. of 1-phenyl-2-amino-indanol-(3) is mixed with 2.3 g. of pentamethylene dibromide and 20 cc. of toluol (water-free). The mixture is cooked while excluding moisture for 3 hours, while stirring and refluxing. 1.7 g. of sodium bicarbonate and 10 cc. of toluol is then added. While thoroughly stirring, the mixture is then cooked for an additional 15 hours, under refluxing. After cooling, dilute sodium hydroxide and chloroform is added. The chloroform-toluol solution is separated and washed with water. The chloroform-toluol solution is concentrated in a steam bath and by the addition of etherical hydrochloric acid there is precipitated 1-phenyl-2-piperidino-indanol-(3). To redissolve the same, the hydrochloride is dissolved in methanol, de-colored with carbon and mixed with ether whereby the hydrochloride is precipitated. The melting point of the product is 247–248° C.

The reaction mechanism is as follows:

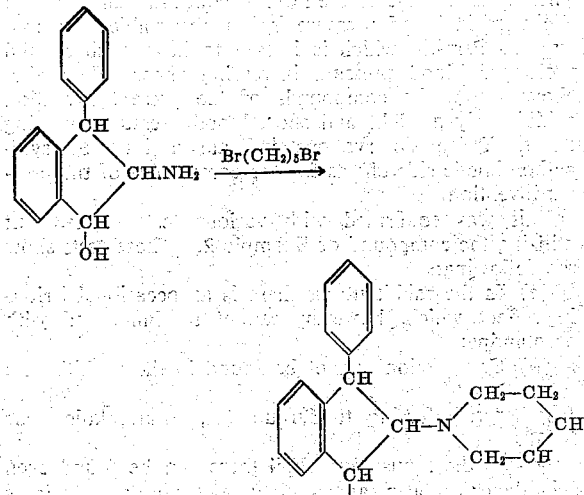

EXAMPLE 9

*1-phenyl-1-methyl-2-amino-indianol-(3)*.—15 g. of 1-phenyl-1-methyl-indianone-(3), produced according to C. F. Koelsch, Jour. Am. Chem. Soc. 65, 59 (43), is mixed with 150 cc. of benzol. While stirring and cooling in ice water there is introduced hydrogen chloride gas and 8 g. of butyl nitrite is slowly added dropwise. After 30 minutes it is removed from the cooling bath and suction-filtered an additional 30 minutes whereby the formed isonitroso-ketone is separated. The crystals are washed with petroleum ether. The product melts at 196–198° C.

For reduction, 12 g. of 1-phenyl-1-methyl-2-isonitroso-indanone-(3) is mixed with 96 cc. of methanol which contains 3.3 g. of hydrogen chloride. 2.8 g. of 10% palladium carbon is utilized as catalyst. The hydrogenation is carried out under normal conditions. After the amount of hydrogen taken up which is 96% of the theoretical for reduction of the isonitroso group, the catalyst is activated by the addition of 2.9 cc. of palladium chloride solution (10% palladium). The hydrogenation of the keto group now commences. After an amount of hydrogen is taken up which is 96.1% of the theoretical, the hydrogenation remains practically still. The catalyst is then separated by suction-filtering, the solution is diluted with water and alkalized with soda solution. The precipitated base is filtered-off by suction and washed with water. After drying in a dessicator, it is dissolved in chloroform, decolorized with carbon and 1-phenyl-1-methyl-2-amino-indanol-(3)-hydrochloride is precipitated by means of etherical hydrochloric acid. The same melts at 222–224° C.

The reaction mechanism of this example is as follows:

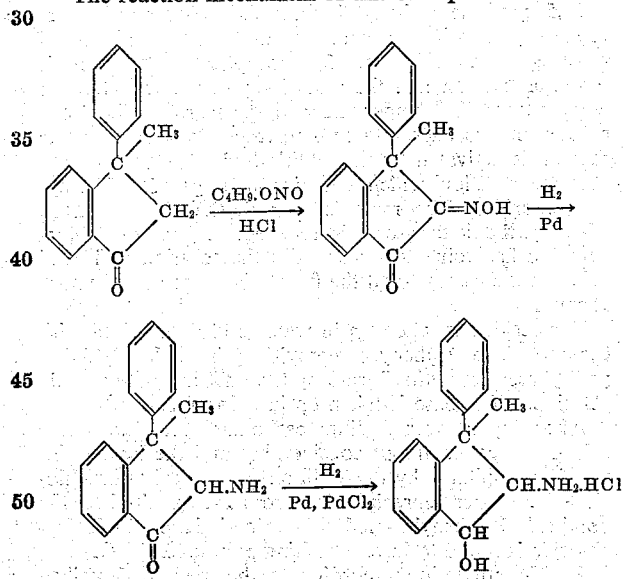

EXAMPLE 10

*1-phenyl-1-methyl-2-dimethylamino-indanol-(3)*.—4 g. of 1-methyl-1-phenyl-2-amino-indanol-(3) is mixed with 5.2 g. of 90% formic acid and 3.7 g. of 38% formaldehyde solution. The mixture is heated for 4 hours in a steam bath. This results in a strong evolution of carbon dioxide and the reaction mixture forms a brownish colored solution. To this solution is added 2 cc. of concentrated hydrochloric acid and the solution is evaporated on a water bath under vacuum. The residue is dissolved in hot water and treated with decolorizing charcoal. The filtered solution is alkalized with soda solution whereby the 1-methyl-2-dimethyl-amino-indanol-(3) is precipitated. The base is taken-up in chloroform. It is dried over potassium carbonate and the chloroform solution is subsequently concentrated in a water bath. The hydrochloride is precipitated from the concentrated solution by means of etherical hydrochloric acid. The product melts at 172–173° C.

The reaction mechanism of this example is as follows:

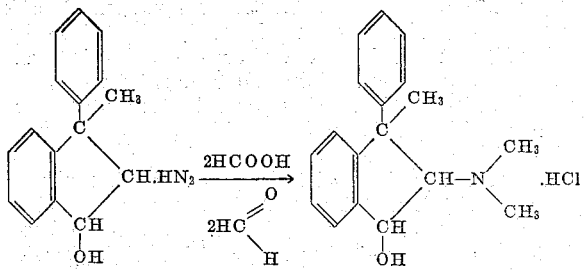

EXAMPLE 11

*1-phenyl-5-methyl - 2 - amino - indanol - (3)*.—29 g. of 1-phenyl-5-methyl-indanone, produced for example according to the method of Pfeiffer and Roos, Journal of Practical Chemistry, volume 159 (1941), pages 13–35, is dissolved in 261 cc. of benzol. Under stirring and with the introduction of hydrochloric acid, 14.2 g. of butyl nitrite is added dropwise to the solution which is cooled with ice water.

The isonitroso ketone already starts to precipitate after about 20 minutes. However, the reaction is allowed to continue for still another hour to complete the conversion by after-reaction and the precipitate is then separated by suction and after washed with cold benzol. The yield is 21.2 g. of crude 1-phenyl-5-methyl-2-isonitroso-indanone-(3); the melting point is 211–212° C. with decomposition.

12.5 g. of the 1-phenyl-5-methyl-2-isonitroso-indanone-(3) is dissolved in 100 cc. of methanol which contains 5.5 g. of hydrogen chloride. 3 g. of palladium carbon is added as catalyst and the mass is hydrogenated at room temperature and under normal pressure. When the amount of hydrogen taken up corresponds to 2 mols, the catalyst is activated by the addition of a palladium (II)-chloride solution which contains 0.78 g. of palladium (II)-chloride. The mass is then further hydrogenated whereby the keto group is reduced. After the hydrogenation has come to a standstill, the solution is filtered off from the catalyst and the filtrate is concentrated under vacuum.

The residue is taken up in water and decolorized with carbon. The 1-phenyl-5-methyl-2-amino-indanol-(3) is precipitated from the filtrate by the addition of ammonia solution. The base is taken up in chloroform.

After drying over calcium carbonate, the chloroform solution is concentrated considerably and the hydrochloride is precipitated by the addition of ethereal hydrochloric acid. After reprecipitation from methanol-ether, the obtained 1 - phenyl-5-methyl-2-amino-indanol-(3)-hydrochloride is found to have a melting point of 232° C.

By N-methylation according to the method described in Example 2, the 1-phenyl-5-methyl-2-amino-indanol-(3) can be converted to the corresponding 1-phenyl-5-methyl-2-dimethyl-amino-indanol-(3) which has a melting point of 144–146° C., or to the corresponding hydrochloride thereof which has a melting point of 128–132° C.

Tests were carried out to determine the therapeutic activity, side effects and toxicity of the compounds of the present invention. The results of these tests are summarized in the tables which follow.

The following information is given for a better understanding of the tables:

Column No. I on the top line gives the reference test number and on the lower line gives the example number in which the compound tested is described. The last three compounds tested are for comparison purposes with compounds which are not claimed herein.

Column No. II gives the structural formula of the compounds listed except in the case of Pervitin which is desoxyephedrin hydrochloride.

Column No. III indicates the toxicity of the compounds tested. This toxicity value was determined by finding out the dose (in milligrams per kilogram of body weight of the rats) at which just 50% of the animals die after intravenous (i.v.) injection of the compound.

From the literature (compare Heubner, Naunyn-Schmiedebergs Archiv, volume 202, page 594 (1943); Hauschild, Klinische Wochenschrift, volume 17, page 1257 (1938)) it is known that the toxicity determination of Pervitin show extremely dispersed values.

Column No. IV indicates the result obtained from the determination of the analeptic activity of the compounds. The measurement for the analeptic activity is based upon the Veronal (Barbital, diethylbarbituric acid) antagonism. The tests determine to what extent the effect of Veronal could be suppressed with respect to the start of falling asleep by the pretreatment of the experimental animals (rats which had been hungered for two hours before the test) with the substance to be tested.

180 mg. of Veronal per kg. of body weight when introduced into the testing animals intraperitoneally (i.p.) puts the animal to sleep within 30 minutes. If the substance to be tested has analeptic activity, the going to sleep is delayed or arrested by the application of the substance to be tested intraperitoneally 15 minutes before the giving of the Veronal. In these tests it was observed how many of the three test animals were awake 30 minutes and 60 minutes after the giving of the Veronal.

The number of animals remaining awake after 30 minutes gives the measure for the "retardation" and after 60 minutes for the "arresting."

Column No. V gives the results of the tests to determine the analgesic activity of the compounds set forth. (Compare C. M. Suter, Medicinal Chemistry, volume L, page 393, next-to-the-last paragraph No. 3, New York, John Wiley & Sons Inc., 1951.)

The pain reaction time of the white mouse was used as a measure. By this is understood the time which passes until the test animal which has been placed upon a copper plate heated to 58° C. first starts to run away. The test animal is placed on the heated copper plate 30 minutes and 60 minutes after the intraperitoneal injection of the substance to be tested and the time until the animal starts to run away is observed. This value is given in percent of the time which it takes an untreated animal to run away, the time for the untreated animal being the blank time.

Column No. VI gives the values for the effect of the compounds specified on the blood pressure. The method used is the Trendelenburg method on cats and rabbits. These tests ascertained the level of concentration at which a change in blood pressure is just observable. In contrast to Pervitin which is known to have a sharp and prolonged blood pressure increasing effect (Hauschild, above-cited), the compounds of the present invention exhibit only a slight and short blood pressure lowering effect. These observations indicate a lack of sympathomimetic side effects for the compounds of the present invention.

This was confirmed with various tests carried out utilizing the compound of Example 2. These tests show the following:

(a) In the rabbit uterus there is an occasional irritating effect which, however, cannot be influenced with ergotamine;

(b) Constriction cannot be found in the rabbit's ear;

(c) No tachycardia can be observed in the isolated frog-heart; referring to Straub (cf. Pharmakologische Methoden Leopold Ther, 1949, S. 154 ff. Stuttgart);

(d) In the mouse eye pupil there can be found even by higher concentrations only a slight and quickly reversible mydriasis; and (e) In rabbits, tests in which 5–10 mg./kg. was introduced subcutaneously did not result in an increase in the blood sugar level.

With humans, after introduction of 80 mg. per os no hyperglycemia or glycosuria could be found.

The following table summarizes the test results:

| Col. I. | Col. II | Col. III | Col. IV | | | Col. V | | | Col. VI | |
|---|---|---|---|---|---|---|---|---|---|---|
| Compound of Example No. | Compound | Toxicity, Lethal Dose for 50% in mg./kg. body wt.— Rats, i.v. | Analeptic Action on 3 animals | | | Analgesic Activity Pain Reaction Time in— | | | Concentration which affects the blood pressure | |
| | | | mg./kg., i.p. | Still awake after— | | mg./kg., i.p. | Percent of Blank after— | | mg./kg. | Effect |
| | | | | 30 min. | 60 min. | | 30 min. | 60 min. | | |
| 2377: (1), (3), (4). | [structure: 1-phenyl-2-amino-indanol · HCl] | 137.8 | 90<br>125 | 3<br>3 | 0<br>3 | 60 | 254 | 221 | 2.0 | L |
| 2405: (2) | [structure: 1-phenyl-2-dimethylamino-indanol · HCl] | 86.5 | 16<br>22<br>31 | 3<br>3<br>3 | 1<br>2<br>3 | | | | 1.0 | L |
| 2511: (5), (6) | [structure: 1-methyl-2-amino-indanol · HCl] | 194 | 90 | 1 | 1 | 20 | 100 | 100 | 1.0 | L |
| 2516: (7) | [structure: 1-phenyl-2-methylamino-indanol · HCl + ½H₂O] | 137.5 | 31<br>45 | 3<br>3 | 1<br>3 | | | | 0.1 | L |
| 2446: (8) | [structure: 1-phenyl-2-piperidino-indanol · HCl] | 107.5 | 62<br>90 | 0<br>0 | 0<br>0 | 50 | | | 0.5 | ¹L |
| 2686: (10) | [structure: 1-phenyl-3,3-dimethyl-2-dimethylamino-indanol · HCl] | 61.3 | 60 | | | 50 | 266 | 167 | 1.0 | L |

| Col. I. | Col. II | Col. III | Col. IV | | | Col. V | | | Col. VI | |
| --- | --- | --- | --- | --- | --- | --- | --- | --- | --- | --- |
| | | Toxicity, Lethal Dose for 50% in mg./kg. body wt.— Rats, i.v. | Analeptic Action on 3 animals | | | Analgesic Activity Pain Reaction Time in— | | | Concentration which affects the blood pressure | |
| Compound of Example No. | Compound | | mg./kg., i.p. | Still awake after— | | mg./kg., i.p. | Percent of Blank after— | | mg./kg. | Effect |
| | | | | 30 min. | 60 min. | | 30 min. | 60 min. | | |
| 2562: (11) | | 61 | 45 | 3 | 3 | 20 | 229 | 206 | 0.25 | L |
| 2563: (11) | | 38 | 16<br>22 | 2<br>3 | 0<br>2 | | | | 0.12 | L |
| 2482: (5) | | 152.5 | 90<br>125 | 2<br>3 | 1<br>2 | 20 | 200 | 165 | | L |
| Pervitin | | 7.5–76 | 4 | 3 | 1 | (²) | (²) | (²) | (³) | (³) |
| 2687: (compare 2). | | 97 | 90 | 1 | 0 | 5 | 266 | 190 | 1.0 | L |
| 2512: known compound. | | 388 | 90 | 1 | 0 | 100 | 196 | 216 | | |

L=lowering.
¹ Local anesthetic action.
² Limited effect close to toxicity level.
³ Strong increase.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, an amino-indane selected from the group consisting of amino-indanes having the following structural formula:

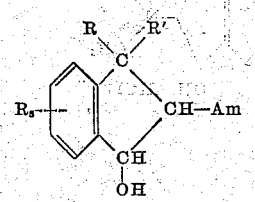

wherein R is selected from the group consisting of hydrogen, and lower alkyl; wherein R' is selected from the group consisting of lower alkyl radicals and the phenyl radical; wherein Am is selected from the group consisting of the amino group, mono-substituted amino groups substituted by a lower alkyl radical, di-substituted amino groups substituted by lower alkyl radicals and 5 and 6 member saturated nitrogen-containing heterocyclic radicals linked to the rest of the molecule by the N atom; and wherein $R_s$ is selected from the group consisting of hydrogen and lower alkyl radicals; and of acid addition salts thereof.

2. As a new composition of matter, an amino-indan having the following structural formula:

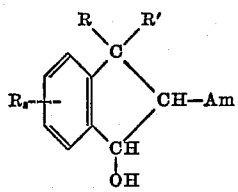

wherein R is a hydrogen atom; wherein R' is the phenyl group; wherein Am is a mono-substituted amino group substituted by a lower alkyl radical; and wherein $R_s$ is a hydrogen atom.

3. As a new composition of matter, an amino-indan having the following structural formula:

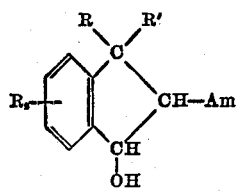

wherein R is a hydrogen atom; wherein R' is the phenyl group; wherein Am is a di-substituted amino group substituted by lower alkyl radicals; and wherein $R_s$ is a hydrogen atom.

4. As a new composition of matter, an amino-indan having the following structural formula:

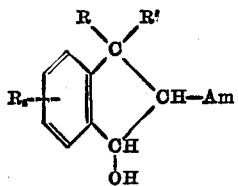

wherein R is a lower alkyl group; wherein R' is the phenyl group; wherein Am is the amino group; and wherein $R_s$ is a hydrogen atom.

5. As a new composition of matter, an amino-indan having the following structural formula:

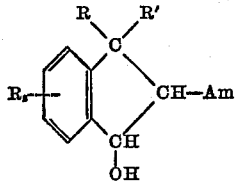

wherein R is a lower alkyl group; wherein R' is the phenyl group; wherein Am is a di-substituted amino group substituted by lower alkyl radicals; and wherein $R_s$ is a hydrogen atom.

6. As a new composition of matter, 1-phenyl-2-amino-indanol-(3) having the following structural formula:

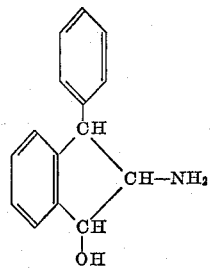

7. As a new composition of matter, 1-phenyl-2-dimethylamino-indanol-(3) having the following structural formula:

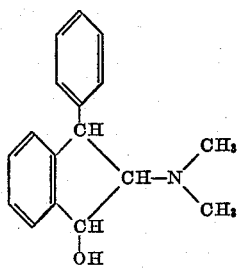

8. As a new composition of matter, 1-phenyl-2-methylamino-indanol-(3) having the following structural formula:

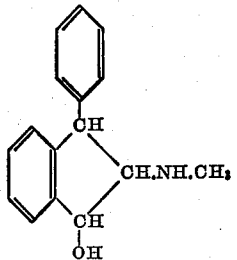

9. As a new composition of matter, 1-phenyl-1-methyl-2-amino-indanol-(3) having the following structural formula:

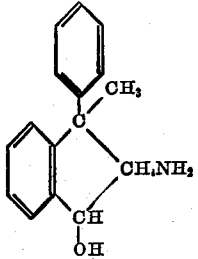

References Cited in the file of this patent

UNITED STATES PATENTS

| | | |
|---|---|---|
| 2,366,534 | Kirby | Jan. 2, 1945 |
| 2,441,069 | Hoffmann | May 4, 1948 |
| 2,578,787 | Benneville | Dec. 18, 1951 |
| 2,794,048 | Richter | May 28, 1957 |

FOREIGN PATENTS

| | | |
|---|---|---|
| 598,124 | Germany | June 6, 1934 |

OTHER REFERENCES

Braun, et al.: Berichte der deutschen chemischen gesellschaft, vol. 55B, pp. 3648–63, 1922.

Marvel et al.: Journal of the American Chemical Society, vol. 46; pp. 2093–2099, 1924.

Heinzelmann, et al.: Journal of Organic Chemistry, vol. 14, pp. 907–910, 1949.